United States Patent [19]

Hatano et al.

[11] Patent Number: 4,519,822

[45] Date of Patent: May 28, 1985

[54] CYCLONE

[75] Inventors: Hirofumi Hatano; Yoji Hirota, both of Kitakyushu, Japan

[73] Assignees: Mitsubishi Mining and Cement Co.; Mitsubishi Jukogyo Kabushiki Kaisha, both of Japan

[21] Appl. No.: 513,073

[22] Filed: Jul. 12, 1983

Related U.S. Application Data

[63] Continuation of Ser. No. 335,674, Dec. 30, 1981, abandoned.

[30] Foreign Application Priority Data

Jan. 21, 1981 [JP] Japan .................................. 56-2840

[51] Int. Cl.3 .............................................. B01D 45/12

[52] U.S. Cl. ................................ 55/459 R; 55/459 B

[58] Field of Search ............. 55/459 R, 459 A, 459 B, 55/459 C, 459 D, 413–416

[56] References Cited

U.S. PATENT DOCUMENTS

| | | | |
|---|---|---|---|
| 394,240 | 12/1888 | Alliuston et al. . | |
| 398,788 | 2/1889 | Mundy . | |
| 710,604 | 10/1902 | Osborne et al. . | |
| 734,627 | 7/1903 | Southerland . | |
| 1,245,540 | 11/1917 | Wegner . | |
| 1,344,146 | 6/1920 | Peck . | |
| 2,067,422 | 1/1937 | Severson | 55/459 R |
| 2,101,249 | 12/1937 | Frisch | 209/144 |
| 2,271,634 | 2/1942 | Fletcher et al. | 55/459 R |
| 2,298,285 | 10/1942 | Fletcher | 55/459 R |
| 4,028,076 | 6/1977 | Fields | 55/459 B |
| 4,097,358 | 6/1978 | Wiseman | 55/459 R |
| 4,248,699 | 2/1981 | Hukki | 209/144 |
| 4,265,640 | 5/1981 | Bielefeldt . | |

FOREIGN PATENT DOCUMENTS

| | | | |
|---|---|---|---|
| 32647 | 11/1907 | Austria | 55/413 |
| 22149 | 6/1947 | Finland . | |
| 1018743 | 2/1966 | United Kingdom . | |

*Primary Examiner*—Bernard Nozick
*Attorney, Agent, or Firm*—McGlew and Tuttle

[57] ABSTRACT

There is provided a cyclone which has a guide plate for conducting a fluid into a fluid-discharge pipe, the guide plate taking the place of a portion of a fluid-discharge pipe extending vertically downwardly in the main body of the cyclone. The fluid-discharge pipe has any shape of its own in cross section. This cyclone may include a fluid-discharge pipe installed in a position away from the center of main body of the cyclone and inclined against the direction of central axis of the cyclone.

1 Claim, 17 Drawing Figures

CYCLONE

This is a continuation of application Ser. No. 335,674 filed Dec. 30, 1981, now abandoned.

FIELD AND BACKGROUND OF THE INVENTION

This invention relates to an improved cyclone for separating solid particles from a fluid containing the same.

In general, the cyclone is simple in construction and is used extensively where a separation of solids and dust collection is needed. Large pressure loss and power consumption, however, are considered the significant drawbacks of the cyclone, which is particularly the case with cyclones provided in continuous series for practical use.

SUMMARY OF THE INVENTION

The object of the invention is to provide a cyclone that is sufficient to eliminate all the aforesaid drawbacks. Namely, the invention provides a cyclone which has proved capable of largely reducing pressure loss almost without lowering the function of separation of solids.

Also, an object of the present invention is to provide cyclones in continuous series for use, which are fitted with an effective fluid-discharge pipe of a suitable cross-sectional surface and of a suitable degree of inclination to the center of the main body of the cyclone.

Another object of the invention is to provide a cyclone, the height of which is reduced without lowering the function of separating solids.

All other objects and characteristics of the invention will become apparent from the following description with reference to the accompanying drawings.

BRIEF DESCRIPTION OF THE DRAWINGS

FIGS. 2–15 and 16 show preferred embodiments of the cyclone of the present invention.

In more detail, FIGS. 2 and 4 are front views of a preferred embodiment each having a semi-circular guide plate. FIGS. 3 and 5 are cross-sectional views of FIGS. 2 and 4 taken along the lines A—A and B—B respectively.

FIG. 6 is a front view of a preferred embodiment having a guide plate of curved surface in closed contact with the inner wall of the cyclone.

FIG. 7 is a cross-sectional view of FIG. 6 taken along the line C—C.

FIG. 8 is a front view of a preferred embodiment having a bent guide plate.

FIG. 9 is a cross-sectional view of FIG. 8 taken along the line D—D.

FIG. 10 is a front view of a preferred embodiment having a guide plate of curved surface.

FIG. 11 is a cross-sectional view of FIG. 10 taken along the line E—E.

FIG. 12 is a front view of a preferred embodiment having a wound guide plate.

FIG. 13 is a cross-sectional view of FIG. 12 taken along the line F—F.

FIG. 14 shows a cyclone provided with an inclined fluid-discharge pipe.

FIGS. 15, (a), (b), (c), (d) and (e) are plan views exemplifying the relationship of deflection between the fluid-discharge pipe and the main body of the cyclone.

FIG. 16 shows a profile of a conventional cyclone.

In FIGS. 8–15, the main body of the cyclone is shown by dotted chain lines.

DESCRIPTION OF THE PREFERRED EMBODIMENTS

Figure 1:
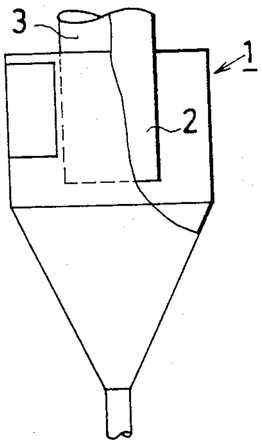
FIGS. 1 and 16 each show a conventional cyclone.

As shown in FIGS. 2–15 and 17, the present invention provides a cyclone generally designated 1, which is characterized in that a portion 2 (hereinafter called an internal cyclinder and shown in FIG. 1) of a fluid-discharge pipe which extends vertically downwardly in the cyclone is removed, and instead, a guide plate 4 for conducting a fluid into the fluid-discharge pipe 3 is installed in the main body 5 of the cyclone and the fluid-discharge pipe 3 is designed to take any shape in cross section. The guide plate 4 is assymetric with the body axis.

Thus, the invention provides the cyclone 1, characterized in that the guide plate 4 for conducting a fluid into the fluid-discharge pipe 3 is installed in place of the internal cylinder 2 in the main body 5 of the cyclone, the fluid-discharge pipe 3 is designed to take any shape in cross section and is disposed in a position offset from the center of the main body of the cyclone 1. Moreover, the invention includes a cyclone provided with the fluid-discharge pipe 3 inclined against the direction of a central axis of the main body 5 of the cyclone.

The shape of the guide plate 4 for conducting a fluid is not limited but, for example, the fluid-discharge pipe 3 may be extended downwardly in the main body 5 of the cyclone and take such a shape as the portion thus extended may be cut away in part (for example, see FIGS. 2–5 and 14), and a bent plate (FIGS. 8–9), a plate of curved surface (FIGS. 6–7 and 10–11) and a wound plate (FIGS. 12–13) may be employed in the same manner. Yet, the shape of the guide plate 4 is not limited to the aforesaid ones but various other shapes are available insofar as the guide plate is designed to face the flow of fluid in the main body 5 of the cyclone and to conduct a fluid into the fluid-discharge pipe 3.

By providing the guide plate 4 of the kind, it is possible to reduce pressure loss in the cyclone of the present invention in a remarkable manner.

Since the fluid-discharge pipe 3 is not required to have its internal cylinder extend vertically downwardly in the main body of the cyclone, according to the present invention, it is possible to provide any shape of the fluid-discharge pipe, for example, besides a circular shape, an elliptical, square, rectangular or trapezoid or other suitable shapes may be taken.

In the case of using cyclones of the kind which are in continuous series, the shape of an inlet of the preceding cyclone can be conformed to that of the succeeding one so that no irregular connection is required which is found convenient for a piping operation or refractory treatment, thus reducing pressure loss in a pipe passage.

According to the present invention, the aforesaid first feature is accompanied by the second feature so that the fluid-discharge pipe 3 is disposed in such a manner as its center is deflected from the plumb center of the main body 5 of the cyclone whereby pressure loss in the cyclone can be further reduced.

The position of installation of the fluid-discharge pipe 3, namely, the direction of its off-set may be such that the fluid flowing from the inlet of the cyclone has only to turn more than about half a circle in the cyclone. In other words, it may be any one exemplified in FIGS. 15, (a)-(e).

Also by installing the fluid-discharge pipe 3 in an inclined manner (See FIGS. 12-14), it is possible to make said pipe coincident with the direction of the fluid to the largest possible extent and to attempt the reduction of pressure loss and suitable linear condition of a pipe passage so that the designing of rational arrangements becomes possible.

Next, the action of the cyclone of the present invention will be explained in further detail hereinafter.

Firstly, in the case of a conventional cyclone, a fluid containing dust conducted from its inlet is swirled in the cyclone until solid particles are separated by centrifugal force and the solid particles thus separated are allowed to fall together with the swirled fluid along the internal wall of the cyclone. The swirled fluid reaches the conical portion of the cyclone where it becomes a flow swirling and ascending about the center of the cyclone until it is discharged from the cyclone through the fluid-discharge pipe 3.

In contrast, according to the present invention a fluid conducted into the cyclone is allowed to swirl in the cyclone until solid particles therein are separated by centrifugal force and simultaneously, part of the fluid conducted into the fluid-discharge pipe 3 by means of the guide plate 4 can be discharged immediately from the cyclone. Accordingly, there occurs a reduction in the amount of fluid swirling and ascending in the cyclone so that the speed of its flow becomes low and pressure loss is reduced to the required minimum. Moreover, this effect becomes outstanding with the positioning or off-set of the fluid-discharge pipe 3 away from the center of the main body of the cyclone 5. Likewise, by inclining the fluid-discharge pipe 3 so as to coincide with the direction of fluid flow, it is possible to further reduce pressure loss.

At the same time, with respect to the mode of separation of solid particles from the fluid, the fluid flowing into the cyclone firstly makes the same swirling movement as is the case with the usual cyclone, after which it is bypassed so that solid particles can be separated at an early stage except those approximate to particle size of possible limits of separation. Since there ensues no recurrent dispersion of solid particles into the fluid at the lower part of the cyclone, the cyclone of the present invention, with the same size and under the same condition as a conventional cyclone, will make almost no difference in the function of separation from the latter.

Moreover, since the cyclone of the present invention permits only a little flow of swirling fluid at the lower part of the cyclone and also reduces an ascending and swirling flow of fluid, there seldom occurs a recurrent dispersion of solid particles once separated so that the height of the cyclone can be decreased according to the present invention.

Figure 16:
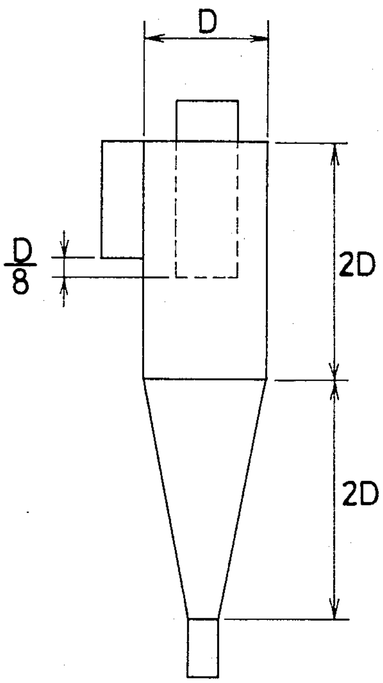
Figure 17:
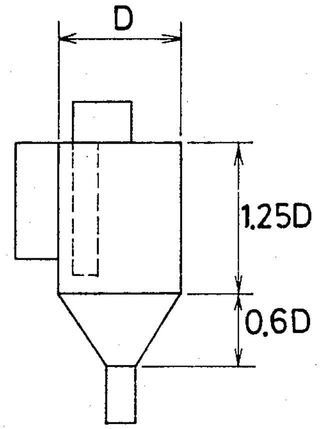
FIG. 17 shows a profile of an eccentric cyclone provided with the guide plate of the present invention.

FIGS. 16 and 17 show an example of difference in size between a so-called common cyclone and that of the present invention in the case of the same cylindrical diameter and almost equal percentage of dust collection.

According to the present invention, the effect of the cyclone will be explained in more detail with reference to certain preferred embodiments hereinafter.

Preferred embodiment 1

Figure 4:
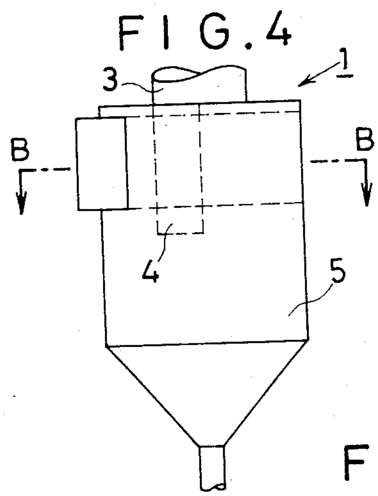
Figure 5:
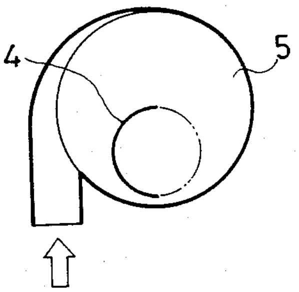

As shown in FIGS. 4 and 5 (Type I) and FIGS. 6 and 7 (Type II), the results of dust collection with cool air containing dust, obtained by the cyclone of the present invention, are as follows.

Figure 6:
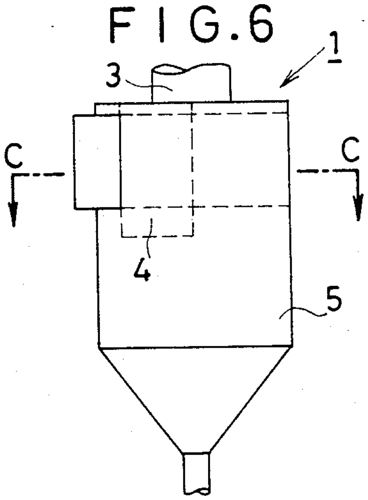
Figure 7:
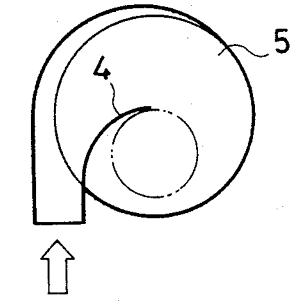
Figure 8:
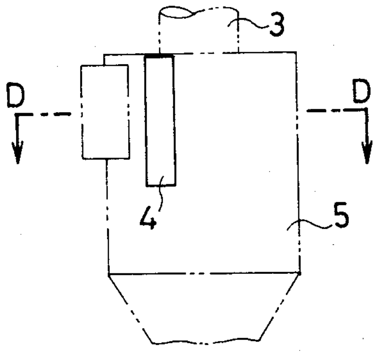
Figure 9:
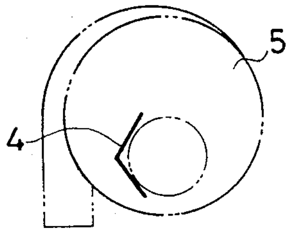
Figure 10:
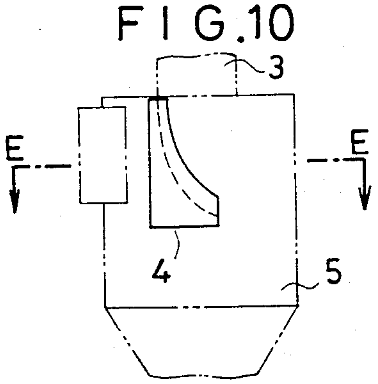
Figure 11:
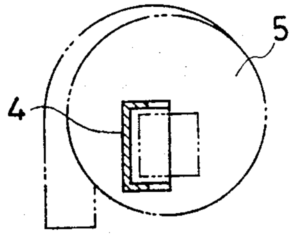
Figure 12:
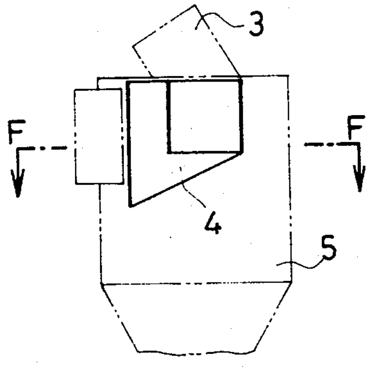
Figure 13:
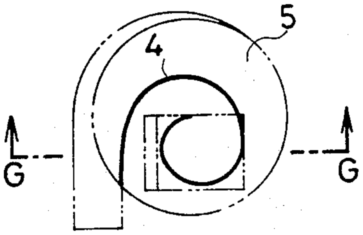
Figure 14:
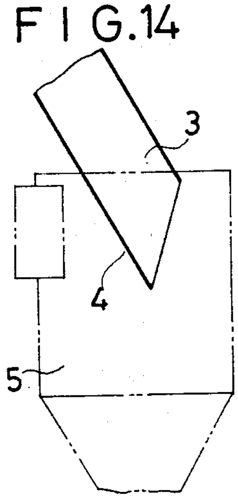
Figure 15:
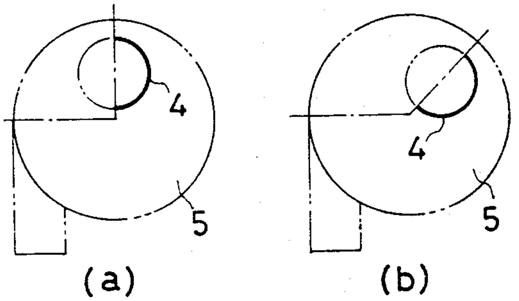
Figure 15:
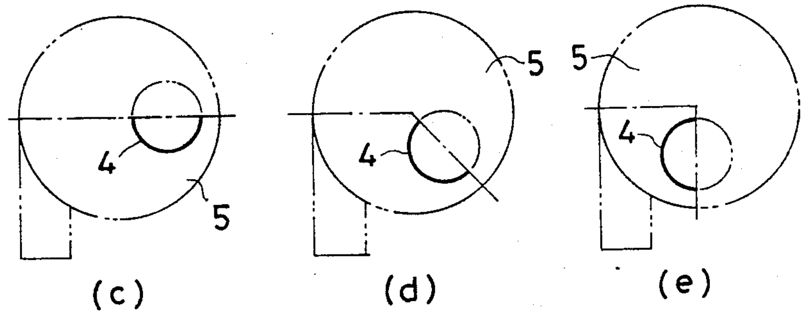

| | |
|---|---|
| Size of main body of cyclone: | |
| Cylindrical portion | Diameter 630 mm × length 800 mm |
| Conical portion | Top angle 60° × length 600 mm |
| Inlet | Rectangular, width 158 mm × height 315 mm |
| Outlet of fluid | Circular, Diameter 315 mm |
| Flow speed of fluid at inlet | 20 m/sec. |
| Kind of powder dust | 88 μm, 13% raw meal cement on sifter |
| Concentration of powder dust at inlet | 1,200-1325 g/Nm$^3$ |
| Guide plate: | |
| Type I | Longitudinally half-divided cylinder of diameter 315 mm, length 430 mm |
| Type II | Plate of curved surface as shown in FIGS. 6 and 7, length 430 mm |
| Direction of off-set of fluid-discharge pipe | As shown in FIGS. 5 and 7 |

| | Type I | | Type II | |
|---|---|---|---|---|
| Percentage of off-set | Pressure loss (water column mm) | Percentage of dust collection (%) | Pressure loss (water column mm) | Percentage of dust collection (%) |
| 0 | 160 | 96 | 55 | 95 |
| 48 | 80 | 96 | 47 | 93 |
| 81 | 55 | 94 | 40 | 93 |
| 100 | 51 | 92 | — | — |

Percentage of off-set has the following meanings, it is defined as 0% when the centers of the main body 5 of the cyclone and the fluid-discharge pipe 3 become coincident and when the fluid-discharge pipe 3 is off-set to a position where its inner wall comes in contact with the inner wall of the main body 5 of the cyclone, the distance between both centers is defined as 100% and then said distance is subdivided into equal intervals to show respective percents.

Preferred embodiment II

The internal cylinder of a conventional cyclone was removed so as to form the cyclone as shown in FIGS. 6 and 7 (Type II) of the present invention and this cyclone was used to obtain the following results.

| | |
|---|---|
| Size of main body of cyclone: | (Size inside refractory bricks) |
| Cylindrical portion | Diameter 3300 mm × length 2050 mm |
| Conical portion | 3600 mm |
| Inlet | Rectangular, width 1100 mm × height 1700 mm |
| Kind of fluid | Exhaust gas from cement burning plant |
| Temperature of fluid | 598-617° C. |
| Kind of powder dust | 88 μm, 13% burnt cement on sifter |
| Concentration of powder dust at inlet of cyclone | 1100-1300 g/Nm$^3$ |
| Flow speed at inlet | 23.8 ± 0.4 m/sec. |
| Percentage of off-set | 0% |
| Pressure loss | Before reconstruction, water column 122 mm |

-continued

| | |
|---|---|
| | After reconstruction, water column 65 mm |
| Percentage of dust collection | Before reconstruction, 86% After reconstruction, 80% |

As is apparent from the above-mentioned preferred embodiments, the present invention can ensure the following effects.

(1) By suitably providing the guide plate for conducting a fluid into the fluid discharge pipe in the main body of the cyclone, it is possible to reduce pressure loss remarkably almost without lowering the function of separation.

(2) Along with the provision of the guide plate for conducting a fluid into the fluid discharge pipe in the main body of the cyclone, the discharge outlet of the fluid is opened in a position away from the center of main body of the cyclone, whereby it is possible to decrease pressure loss by 50–70% almost without lowering the function of separation and, when the percentage of said off-set is made more than 50%, the aforesaid effect becomes all the more outstanding.

(3) It is possible to permit the fluid-discharge pipe to take any shape in cross section so that a pipe connection with the succeeding step can be made convenient, and moreover, along with the installation of the fluid-discharge pipe in an inclined manner, resistance in the pipe passage can be reduced so that this mechanism is to be recommended particularly in the case of cyclones of the kind in continuous series for practical use.

(4) Also, the height of the cyclone can be decreased so that special requirements of floor space for the cyclone can be dispensed with and its economical installation becomes possible.

As explained hereinbefore, the cyclone of the present invention can reduce pressure loss remarkably almost without lowering the function of separation and therefore, this mechanism is very convenient as applied to cyclones of the kind in continuous series for actual use.

Thus, according to the present invention, it is possible to decrease power consumption by a large extent in all industrial fields using cyclones and the effect of the cyclone on energy saving is worth being called enormous.

Figure 2:
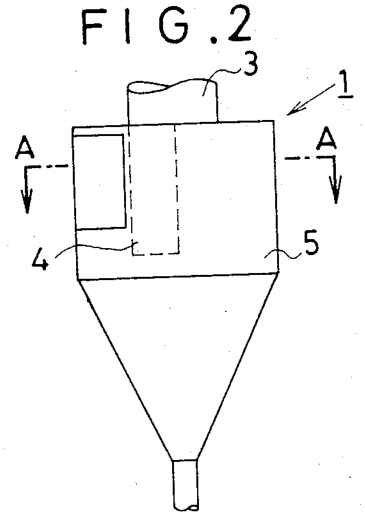
Figure 3:
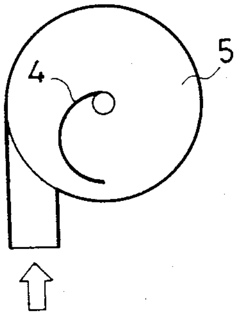

In summary, thus, the invention, as shown in FIGS. 2 and 3, comprises a cyclone device having a cylindrical tubular body 5 with a vertical central axis and a ceiling for defining a space. The ceiling has an opening therethrough which is eccentrically located with respect to the central axis. The tubular body has a downwardly tapering portion which terminates in a circular opening for discharging solid material. A fluid inlet is connected tangentially to the cylindrical body for supplying fluid with particles to be separated to the space in a tangential direction with respect to the central axis. The fluid is directed to rotate about the central axis. About three-quarters of the way around the cylindrical tubular body 5, a semi-circular guide plate 4 is provided which extends downwardly from the ceiling through a portion of the cylindrical body portion 5 but terminates just above the lower tapering portion thereof. The guide plate extends down from an edge of the opening for the fluid discharge 3 and faces away from the entry point for the fluid inlet as shown in FIG. 3. In this way, the guide plate has a front face which is concave in a direction facing the oncoming fluid flow. The guide plate 4 has vertical edges with a radially inner edge being near the central axis and a radially outer edge being near but spaced away from the body 5 in the vicinity of the fluid inlet.

What is claimed is:

1. A cyclone device comprising:

a cylindrical tubular body having a vertical central axis and a ceiling for defining a space, said sealing having a circular opening with a center at an eccentric location with respect to said central axis;

a tapered body portion connected to a lower edge of said cylindical tubular body, tapering inwardly and downwardly and having a lower central solid particle outlet opening;

a fluid inlet connected tangentially to said cylindrical tubular body for supplying fluid with particles to be separated, to said space in a tangential direction around said central axis, said fluid inlet connected to said body at a location to cause the fluid to rotate in said body around said central axis in a rotation direction;

a cylindrical fluid discharge pipe connected to said ceiling around said circular opening therein, said pipe opening into said space and terminating at said ceiling and before said pipe extends into space, no part of said fluid discharge pipe extending into said space; and a vertical guide plate having a semi-circular horizontal cross-sectional shape, extending downwardly from said ceiling only part of the vertical distance of said cylindrical tubular body, said semi-circular guide plate having opposite vertical edges and extending from a part of said opening in said ceiling downwardly into said cyindrical tubular body, said semi-circular guide plate plate being the only structure extending downwardly into said space and being asymmetrically positioned with respect to said semi-circular guide plate being the only structure extending downwardly into said space and being asymmetrically positioned with respect to said central axis, a radially inner one of said vertical edges being in the vicinity of said central axis and a radially outer one of said edges being near but spaced away from an inner surface of said cylindrical tubular body, said semi-circular guide plate being disposed approximately three-quarters of the way round said rotation direction and being convex in a direction facing said location where said fluid inlet is connected to said body, said semi-circular guide plate being concave in a direction facing oncoming fluid moving in the rotation direction;

whereby fluid entering through said fluid inlet and moving around said space defined by said cylindrical tubular body engages against said semi-circular guide plate which reduces an amount of rotation of fluid in said tubular body and advances a separation of particles from the fluid, the fluid moving upwardly through said discharge pipe and the particles moving downwardly through said solid particle opening.

* * * * *